US011455387B2

(12) United States Patent
Hanel et al.

(10) Patent No.: US 11,455,387 B2
(45) Date of Patent: Sep. 27, 2022

(54) WORKER THREAD SCHEDULING IN TRUSTED EXECUTION ENVIRONMENT

(71) Applicant: Trustonic Limited, Cambridge (GB)

(72) Inventors: Lukas Hanel, Valbonne (FR); Olivier Deprez, Valbonne (FR); Alexandre Gonzalo, Valbonne (FR)

(73) Assignee: Trustonic Limited, Cambridge (GB)

( * ) Notice: Subject to any disclaimer, the term of this patent is extended or adjusted under 35 U.S.C. 154(b) by 304 days.

(21) Appl. No.: 16/836,002

(22) Filed: Mar. 31, 2020

(65) Prior Publication Data

US 2021/0064740 A1  Mar. 4, 2021

(30) Foreign Application Priority Data

Aug. 30, 2019 (GB) ...................................... 1912513

(51) Int. Cl.
*G06F 21/53* (2013.01)
*G06F 9/50* (2006.01)
*G06F 21/57* (2013.01)

(52) U.S. Cl.
CPC ............ *G06F 21/53* (2013.01); *G06F 9/5038* (2013.01); *G06F 21/57* (2013.01); *G06F 2209/5018* (2013.01)

(58) Field of Classification Search
CPC ...... G06F 21/53; G06F 9/3851; G06F 9/5038; G06F 9/5094; G06F 21/57; G06F 2209/5018

See application file for complete search history.

(56) References Cited

U.S. PATENT DOCUMENTS

| 8,510,805 B2 * | 8/2013 | Zhang ................. G06F 12/1458 726/4 |
| 2005/0081203 A1 | 4/2005 | Aguilar, Jr. et al. |

(Continued)

FOREIGN PATENT DOCUMENTS

| CN | 109960582 | 7/2019 |
| EP | 3155521 | 4/2017 |
| WO | 2015/191358 | 12/2015 |

OTHER PUBLICATIONS

Search Report for GB Application No. 1912513.7 dated Jul. 7, 2020, 5 pages.

(Continued)

*Primary Examiner* — Benjamin C Wu
(74) *Attorney, Agent, or Firm* — Nixon & Vanderhye P.C.

(57) ABSTRACT

A trusted execution environment scheduling method for a device comprising a multicore processor, the processor operable to execute a rich execution environment (REE) and a trusted execution environment (TEE), the method comprising: providing a REE global scheduler in the REE, the REE global scheduler operable to schedule threads for execution in the REE; providing a TEE scheduler in the TEE, the TEE scheduler operable to schedule threads for execution in the TEE, wherein the TEE scheduler determines a number of runnable TEE threads which are either presently, or are awaiting, execution in the TEE and stores the number of runnable TEE threads in a location accessible to threads executing in the REE; providing a plurality of worker threads in the REE, the worker threads being in an activated state or in an deactivated state, wherein when an activated worker thread of the plurality of worker threads is executed according to the schedule of the REE global scheduler the worker thread makes a call to the TEE to cause execution of the TEE on the same core as the worker thread, and wherein the worker thread retrieves the number of (Continued)

runnable TEE threads and compares the retrieved number of runnable TEE threads to the number of currently activated worker threads.

20 Claims, 11 Drawing Sheets

(56) References Cited

U.S. PATENT DOCUMENTS

| | | | | |
|---|---|---|---|---|
| 2009/0240923 A1* | 9/2009 | Covey | ................. | G06F 9/30076 |
| | | | | 712/E9.016 |
| 2019/0075063 A1* | 3/2019 | Mcdonnell | ................. | G06F 9/54 |
| 2019/0340393 A1* | 11/2019 | Mo | ....................... | G06F 21/554 |
| 2020/0274898 A1* | 8/2020 | Xie | .................... | H04L 63/1425 |
| 2020/0311256 A1* | 10/2020 | Deprez | .................... | G06F 9/52 |
| 2021/0011996 A1* | 1/2021 | Li | ....................... | G06F 9/30098 |
| 2021/0103470 A1* | 4/2021 | Yao | ......................... | G06F 21/74 |
| 2021/0374234 A1* | 12/2021 | Bursell | ................... | H04L 9/085 |
| 2022/0006620 A1* | 1/2022 | Bursell | ................. | G06F 21/606 |

OTHER PUBLICATIONS

T. Mishra, "Parallelizing Trusted Execution Environments for Multicore Hard Real-Time Systems" Thesis submitted to the Faculty of the Virginia Polytechnic Institute and State University, May 10, 2019, 69 pages.

* cited by examiner

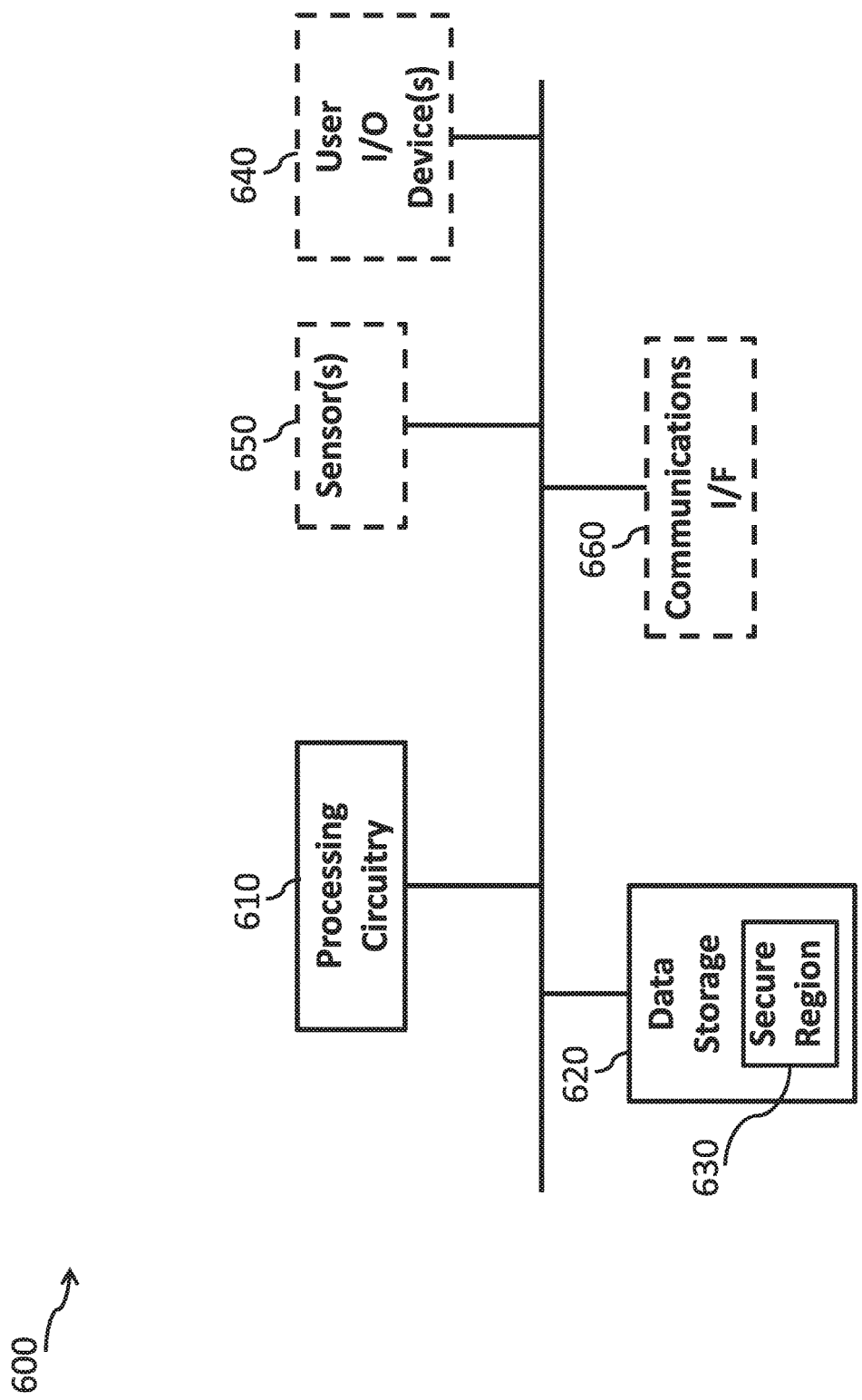

WORKER THREAD SCHEDULING IN TRUSTED EXECUTION ENVIRONMENT

This application claims priority to GB Patent Application No. 1912513.7 filed Aug. 30, 2019, the entire contents of which are hereby incorporated by reference.

FIELD AND BACKGROUND

The present techniques relate to the field of electronic devices. More particularly, they relate to methods for scheduling a Trusted Execution Environment for execution on one or more cores on a multicore processor.

Increasingly, electronic devices are being used to access services which may involve handling of potentially sensitive information, such as mobile banking, access to health care services or handling of employment details. Also, with the increasing development of the Internet of Things (IoT), it is becoming more common for systems such as heating, air-conditioning or street lighting to be controlled based on information provided by electronic devices which may provide sensor information such as temperature data or proximity information indicating whether a user is present, for example. In these scenarios, it is important to ensure the security of sensitive information.

One approach that has been developed in recent years is the use of Trusted Execution Environments (TEEs) which act as a secure area of a processor in which to execute sensitive applications and processes. The TEE is isolated from a Rich Execution Environment (REE) in which a rich-OS such as Android, iOS, Windows or Linux can be executed. Examples of embedded hardware technologies which can be used to support TEE implementations include Arm®'s TrustZone®, AMD's Secure Processor and Intel's Trusted Execution Technology.

One approach to enhancing security is the use of biometric authentication mechanisms such as fingerprint or face recognition. It is desirable to run such biometric authentication as Trusted Applications (TAs) in the TEE to enhance their security.

One problem, however, with executing such biometric authentication in the TEE is that biometric authentication requires a lot of computing power over a short time period and, in general, the TEE is restricted to executing as a single execution thread on a single core of a multicore processor at a time. This restriction is in place since, by definition, the REE (including any Rich-OS scheduler) must only have very limited information on the TEE to maintain security. As such, restriction to a single TEE execution thread has usually been necessary to maintain data consistency, and hence avoid concurrency and security issues, across the various TEE applications and processes.

Certain prior approaches have attempted to address some of these issues through executing part of the biometric authentication in the REE (e.g. the feature extraction algorithm) and executing part of the biometric authentication in the TEE (e.g. the comparison with the stored "target" identity). However, while this offers some enhancement of security over simply executing the whole biometric authentication in the REE it still provides a potential security weakness that a malicious party could attempt to approach.

Another prior approach identified by the present inventors and set out in the Applicant's prior patent application, GB1904088.0 filed 25 Mar. 2019, is hereby incorporated by reference. In this approach, the performance of a TA, such as biometric authentication, can be enhanced by allowing for a Rich-OS scheduler to monitor the computing resources demanded by the TEE and further allowing the Rich-OS scheduler (REE Global Scheduler) to migrate the TEE between low and high performance cores of a heterogeneous multicore processor and/or adjust the voltage/frequency of the core on which the TEE is executed.

However, as identified by the inventors of the present application, while the prior approach set out in GB1904088.0 does enhance performance without sacrificing the security benefits of using the TEE it is desirable to investigate techniques for further enhancing the performance of TAs, including biometric authentication, by more fully utilizing the capacity of a multicore processor.

At least certain embodiments of the present disclosure address one or more of these problems as set out above.

SUMMARY

Particular aspects and embodiments are set out in the appended claims.

Viewed from one perspective there can be provided a trusted execution environment scheduling method for a device comprising a multicore processor, the processor operable to execute a rich execution environment (REE) and a trusted execution environment (TEE), the method comprising: providing a REE global scheduler in the REE, the REE global scheduler operable to schedule threads for execution in the REE; providing a TEE scheduler in the TEE, the TEE scheduler operable to schedule threads for execution in the TEE, wherein the TEE scheduler determines a number of runnable TEE threads which are either presently, or are awaiting, execution in the TEE and stores the number of runnable TEE threads in a location accessible to threads executing in the REE; providing a plurality of worker threads in the REE, the worker threads being in an activated state or in an deactivated state, wherein when an activated worker thread of the plurality of worker threads is executed according to the schedule of the REE global scheduler the worker thread makes a call to the TEE to cause execution of the TEE on the same core as the worker thread, and wherein the worker thread retrieves the number of runnable TEE threads and compares the retrieved number of runnable TEE threads to the number of currently activated worker threads.

By providing a plurality of worker threads in the REE the approach allows for the TEE to be called from a plurality of different sources which allows for concurrent multithreaded execution of the TEE either as multiple threads executing on a single core and/or a multiple threads spread across a plurality of cores depending on where the worker threads themselves are executing. In other words, each activated worker thread executing in the REE is able to spawn a single TEE thread on the same core on which the worker thread is executing. This multi-threaded execution allows for the enhancement in the performance of applications or processes executing in the TEE.

The execution of threads in the TEE is controlled by a multithreading aware TEE scheduler that is executed in the TEE itself. Thereby, security is enhanced as the scheduling of TEE threads is handled from within the TEE and accordingly information on which threads are running in the TEE does not need to be passed to the REE.

Furthermore, by the TEE scheduler determining the number of runnable TEE threads from within the TEE and storing this information to a location accessible to threads executing in the REE allows for a worker thread executing in the REE to perform a comparison between the number of runnable TEE threads and the number of currently activated worker threads. This allows for the worker thread running in the REE to react to any imbalance in the number of runnable TEE threads and the number of potential TEE threads which can be called by activated worker threads. This thereby can ensure that an appropriate amount of resources is provided to the TEE for execution of TEE threads while only passing the minimum of information, i.e. the number of runnable TEE threads, to the REE hence also enhancing security.

In some examples, the TEE scheduler determines the number of runnable TEE threads upon invocation of the TEE scheduler. Thereby, the number of runnable TEE threads is consistently kept up to date. Additionally or alternatively, the number of runnable TEE threads may be determined periodically during execution by the TEE scheduler.

In some examples, the worker thread performs the comparison upon return of the call from the TEE back to the worker thread. Thereby, the comparison is performed at substantially the earliest moment, and accordingly can be acted on in a timely manner, once an instance of the TEE has returned execution back to the TEE. In some examples, this return may be based on execution time in the TEE, interruption by an interrupt, a TEE thread entering a blocked state, or a TEE thread completing.

In some examples, the worker thread performs the comparison upon invocation of the worker thread. Thereby, a comparison can be performed before the worker thread has issued a call to the TEE. Thus, for example, if it is determined that there are excess of worker threads compared to runnable TEE threads the worker thread can act on the comparison prior to calling the TEE which can enhance efficiency by avoiding an unnecessary call to the TEE which could not be effectively utilised.

In some examples, in response to a determination that the number of runnable TEE threads is greater than the number of currently activated worker threads, the worker thread activates additional worker threads. Thereby, the performance of TEE can be enhanced by allowing for an increased provision of activated worker threads and a resulting increase in calls to execute the TEE when it is determined that additional TEE threads are ready for simultaneous execution.

In some examples, in response to a determination that the number of runnable TEE threads is fewer than the number of currently activated worker threads, the worker thread deactivates itself. Thereby, unnecessary allocation of resources to the TEE can be avoided by preventing more simultaneous calls to the TEE than the TEE is able to use to execute runnable TEE threads. This in turn saves computing resources and energy hence potentially increasing battery life and/or increasing the performance of REE threads.

In some examples, the method further comprises concurrently executing the TEE on both a first core and a second core of the multicore processor as a result of calls to the TEE from both a first activated worker thread located on the first core and from a second activated worker thread located on a second core. Thereby, the TEE can exploit the processing resources of two cores simultaneously hence improving the performance of threads executing in the TEE.

In some examples, a first TEE thread executes in the TEE on the first core and a second TEE thread executes in the TEE on the second core, wherein the first TEE thread is a thread belonging to a first trusted application and the second TEE thread is a thread belonging to a second trusted application. Thereby, two trusted applications (TAs) can be simultaneously executed by the TEE hence improving performance by, for example, avoiding the second TA having to wait until the first TA relinquishes execution.

In some examples, a first TEE thread executes in the TEE on the first core and a second TEE thread executes in the TEE on the second core, wherein the first TEE thread and the second TEE thread belong to the same multithreaded trusted application. Thereby, a single TA which demands a large quantity of computing resource (e.g. biometric authentication) which has been written for multi-threaded execution is able to simultaneously execute across a plurality of cores hence improving the performance of the TA executing in the TEE.

In some examples, the REE global scheduler collects thread statistics on the execution of REE threads, wherein when a worker thread calls the TEE the execution of the TEE is transparently extended through the calling worker thread so that the execution of the TEE appears to be part of the worker thread to the REE global scheduler and execution of the TEE resulting from the call of the worker thread is accounted for in the thread statistics of the worker thread.

Thereby, by transparently extending the execution of the TEE through the calling worker thread, the execution resources (e.g. processing time, memory consumption etc.) utilized by the TEE execution context called by the worker thread "looks" to the REE global scheduler to be part of the worker thread. Further, since the TEE execution context is executed on the same core as the worker thread, any changes to the performance of the core that the worker thread is operating on made by the REE global scheduler will also affect the TEE execution context. Accordingly, for example, a spike in resources utilized by the TEE execution context will be "noticed" by the REE global scheduler as a spike in the resources utilized by the worker thread and in response the REE global scheduler may improve the performance of the core on which the worker thread/TEE execution context is operating on, hence improving the performance of the TEE execution context even though the REE global scheduler need not be aware of the TEE execution context's existence.

In some examples, in response to the REE global scheduler determining, using the thread statistics, that the worker thread is utilizing a low or a high proportion of the resources of the core it is executing on, the REE global scheduler decreases or increases the voltage and/or frequency of the core the worker thread is executing on respectively.

Thereby, for example, when the thread statistics indicate that the worker thread is utilizing a high proportion of the resources of the core it is executing on (which may result from high resource utilization of the TEE execution context which is included in the worker thread's statistics) the REE global scheduler is able to dynamically increase the computational performance of the core that the worker thread (and the TEE execution context) is operating on. Conversely, in the case of low resource consumption the core's computational performance may be reduced, for example, to reduce power consumption. The REE global scheduler is able to make such dynamic performance adjustments due to the above-described manner of accounting for the TEE execution context resource consumption within the thread statistics for the worker thread. In some examples, the range of available voltage and/or frequencies for each core may be dependent, at least in part, on the power, voltage and frequency status of other cores. This may, for example, be due to overall power restrictions on the multicore processor. Accordingly, in some examples the REE global scheduler may decrease the voltage and/or frequency of one core to increase the voltage and/or frequency, and hence performance, of another core. Similarly, the REE global scheduler may power down some cores to allow others to be run at higher performance.

In some examples, the multicore processor is a heterogeneous multicore processor where at least one of the cores of the heterogeneous multicore processor has different performance characteristics to another one of the cores of the heterogeneous multicore processor, and wherein in response to the REE global scheduler determining, using the thread statistics, that the worker thread is utilizing a low or high proportion of the resources of the core it is executing on, the REE global scheduler migrates the worker thread to a lower or higher performance core respectively. In some examples, certain cores of the heterogeneous multicore processor are power efficient and have a relatively low computational performance whereas other cores are power-hungry but have relatively high computational performance. An example of such a suitable architecture is Arm® big.LITTLE™. Another example of such a suitable architecture is Arm® DynamIQ™. Having cores with heterogeneous performance allows for threads (including the thread(s) which execute the TEE) to be allocated to cores appropriate for their computing needs. For example, threads which only need low computational performance can be migrated to a power efficient core which may in turn allow a power-hungry core to be placed in a low power state hence reducing energy consumption. Conversely, if a thread requires a high computational performance it can be migrated to a high computational performance core thus allowing the thread to execute in a timely manner.

Thereby, for example, when the thread statistics indicate that the worker thread is utilizing a high proportion of the resources of the core it is executing on (which may result from high resource utilization of the TEE execution context which is included in the worker thread's statistics) the REE global scheduler is able to dynamically migrate the worker thread (and accordingly the TEE execution context which in the present example is executed on the same core as the worker thread) to a higher performance core. Conversely, in the case of low resource consumption the worker thread (and accordingly the TEE execution context) can be moved to a lower performance core, which may for example allow the REE global scheduler to power down one of the higher performance cores or free up computing time to migrate some other process to one of the higher performance cores. The REE global scheduler is able to make such dynamic performance adjustments due to the above-described manner of accounting for the TEE execution context resource consumption within the thread statistics for the worker thread.

In some examples, the method further comprises providing a first TEE thread, a second TEE thread and a third TEE thread in the TEE, wherein responsive to each of the first TEE thread and the second TEE thread sending a request to the third TEE thread such that both the first TEE thread and the second TEE thread are blocked awaiting a response from the third TEE thread, the TEE scheduler removes the first TEE thread and the second TEE thread from the number of runnable TEE threads and ensures that the third TEE thread is included in the number of runnable TEE threads. Thereby, a dynamic account is made of the "true" number of runnable TEE threads which takes into account transitory states, such as being (un)blocked, which temporarily prevents one or more TEE threads from being run. Accordingly, the number of worker threads can be accurately adjusted to the "true" number of runnable threads hence allowing for an efficient use of computing resources.

In some examples, in response to the first TEE thread or the second TEE thread receiving a response from the third TEE thread and hence becoming unblocked, the TEE scheduler re-includes the first TEE thread or the second TEE thread which has become unblocked. Thereby, a dynamic account is made of the "true" number of runnable TEE threads which takes into account transitory states, such as being (un)blocked, which temporarily prevents one or more TEE threads from being run. Accordingly, the number of worker threads can be accurately adjusted to the "true" number of runnable threads hence allowing for an efficient use of computing resources.

In some examples, when the number of runnable TEE threads drops to zero, all worker threads are deactivated. Thereby, there the TEE need not be executed when there is presently nothing for it to do (no runnable TEE threads) hence providing for an efficient use of computing resources.

In some examples, the number of worker threads is limited to a predetermined number and/or the cores on which the worker threads are permitted are restricted to a predetermined subset of the plurality of cores of the multicore processor. Thereby, the resources which the worker threads (and hence execution contexts of the TEE which execute of the same core) can, at least in part, be controlled. Thus, for example, a maximum portion of system resources can be allocated to the TEE hence, in effect, reserving a portion of resources for execution of REE threads hence limiting the impact on execution of the REE threads. In some examples, the cores to which the worker threads are restricted can be fixed, in other examples the restriction can be dynamically adjusted at runtime.

In some examples, when a request is made from an REE application thread to the TEE, the REE application thread itself initially calls the TEE on the same core that the REE application is executing on, and upon return of the call a check is made to determine whether at least one worker thread is activated and responsive to a negative determination activating at least one worker thread. Thereby, it is ensured that when there is a newly runnable TEE thread, for example following a period when there were no runnable TEE threads, that there is at least one activated worker thread and hence that the TEE will be periodically called.

In some examples, the cores on which the worker threads are permitted are restricted to a predetermined subset of the plurality of cores of the multicore processor, and wherein prior to the call by the REE application thread to the TEE, the REE application thread is migrated to one of the predetermined subset of the plurality of cores. Thus, it is ensured that the TEE is only executed on a permitted core (i.e. since an instance of the TEE is called on the same core that the REE application is executing on) even when a REE application newly makes a request to the TEE.

In some examples, when a TEE thread calls a sleep function, the TEE thread which calls the sleep function is removed from the number of runnable TEE threads and the corresponding wakeup time is communicated to the REE to wake up the TEE at the wakeup time. Thus it is ensured that unnecessary resources are not allocated to the TEE which can't execute the TEE thread while definitively ensuring that the TEE will be called shortly after the wakeup time. In some examples, this wakeup time is communicated to the REE global scheduler which ensures that a worker thread will be scheduled and calls the TEE shortly after the wakeup time.

In some examples, the TEE utilizes a microkernel. Thereby, delays in processing requests (e.g. secure interrupts) can be minimised. For example, when a plurality of requests are serialised the microkernel can ensure that requests are handled with minimal delays.

Viewed from one perspective, there can be provided a computer program for controlling a device to perform any of the above-described methods. In some examples, the computer program is stored on a storage medium.

Viewed from one perspective, there can be provided a device comprising: a multicore processor operable to execute a rich execution environment (REE) and a trusted execution environment (TEE); data storage storing at least one computer program for controlling the processing circuitry to perform any of the above-described methods.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which:

FIG. 6: Schematically illustrates an example of an electronic device which can be used to implement teachings of the disclosure.

Figure 1A:
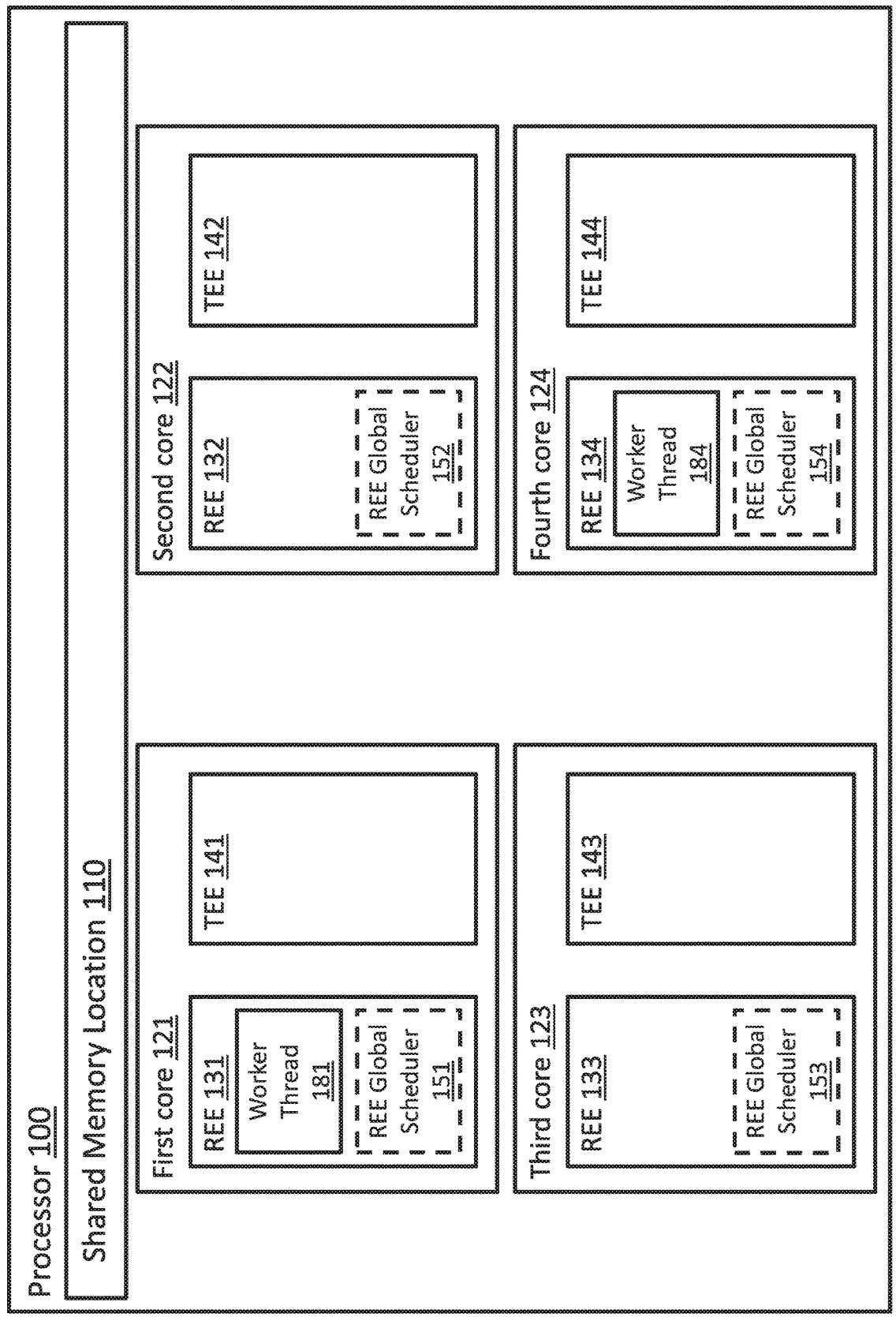
FIG. 1A: Schematically illustrates a multicore processor configured to operate according to teachings of the disclosure before a first execution of worker threads.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

It will be recognised that the features of the above-described examples of the disclosure can conveniently and interchangeably be used in any suitable combination.

DETAILED DESCRIPTION

FIGS. 1A, 1B, 1C, 1D, 1E and 1F show schematic illustrations of a multicore processor 100 configured to operate according to teachings of the disclosure. Each of FIGS. 1A, 1B, 1C, 1D, 1E and 1F depict a multicore processor comprising four cores: a first core 121, a second core 122, a third core 123 and a fourth core 124. While for clarity the figures have been depicted with only four cores it will be understood that the teachings contained herein apply to multicore processors with any plurality of cores. In some examples, the multicore processor 100 may have any of 2, 3, 4, 5, 6, 7, 8, 9, 10, 11, 13, 14, 15 or 16 cores. In some examples, all cores have similar performance characteristics to each other. In other examples, the multicore processor 100 is a heterogeneous multicore processor where at least one of the cores of the heterogeneous multicore processor has different performance characteristics to another of the cores of the heterogeneous multicore processor. For example, the multicore processor 100 may have a first plurality of cores which are power-hungry but have relatively high computational performance and a second plurality of cores which are power efficient and have a relatively low computational performance. An example of a heterogeneous multicore processor architecture which can implement the present techniques is Arm® big.LITTLE™. Another example of such a suitable architecture is Arm® DynamIQ™.

As can be seen the processor includes a shared memory location 110 which is accessible to at least certain threads (e.g. those with elevated privilege levels such as the kernel) in both the REE and TEE. While the shared memory location 110 has been depicted as part of multicore processor 100 it is understood that in some examples the shared memory location 110 may wholly, or in part, reside in static RAM, dynamic RAM, secondary storage or any other memory location accessible to the processor 100.

As can be seen, each of the first core 121, a second core 122, a third core 123 and a fourth core 124 have a normal area (REE 131, REE 132, REE 133 and REE 134 respectively) and a secure area (TEE 141, TEE 142, TEE 143 and TEE 144 respectively). The REEs are operable to run Rich Execution Environment applications, services and threads including: worker threads 181, 182, 183 and 184; and REE global scheduler 151, 152, 153 and 154. In some examples, typically as part of the boot procedure, a REE global scheduler is provisioned in at least one of the REE 131, 132, 133, 134. The TEEs are operable to run Trusted Execution Environment applications, services and threads including: TEE scheduler 161, 162, 163 and 164; TEE thread A 171; TEE thread B 172; TEE thread C 173; and TEE thread D 174. From one perspective, TEE 141, TEE 142, TEE 143 and TEE 144 can be considered, for examples, as TEE execution contexts of a single TEE. The worker threads 181, 182, 183, 184 can be in either an activated or deactivated state. In some examples, all the possible worker threads are provisioned, typically in a deactivated state, as part of a boot up procedure of the device. For clarity in FIGS. 1A to 1F only activated worker threads are depicted. Further, in some examples, a TEE scheduler is provisioned in at least one of the TEE 141, 142, 143, 144 either as part of the boot procedure of the device or upon entry to one or more of the TEE 141, 142, 143, 144.

The REE global scheduler 151, 152, 153 and 154 is depicted in each of FIGS. 1A, 1B, 1C, 1D, 1E and 1F with a dashed line in REE 131, 132, 132 and 133 of the first core 121, second core 122, third core 123 and further core 124. It will be appreciated that depending on the particular way the REE (e.g. by a Rich-OS such as Android, iOS, Windows or Linux) is implementing the REE global scheduler 151, 152, 153 and 154, this scheduler may, for example, be exclusively executing in the REE 131 of the first core 121, be exclusively executing in the REE 132 of the second core 122, be exclusively executing in the REE 133 of the third core 123 or be exclusively executing in the REE 134 of the fourth core 124, be dynamically migrated between the REEs 131, 132, 133 and 134 of the four cores 121, 122, 123 and 124, be executing in a multi-threaded state across both REEs 131, 132, 133 and 134 of the four cores 121, 122, 123 and 124 or any combination of the aforementioned possibilities.

FIG. 1A shows the multicore processor 100 immediately before a first execution of the worker threads. At this time, two worker threads, 181 and 184, are activated on the first core 121 and fourth core 124 respectively and hence are depicted. It is to be understood in the present example that worker thread 182 and worker thread 183 associated with second core 122 and third core 123 respectively are in a deactivated state and hence not shown. It will be appreciated, that while in the present examples one worker thread is associated with each core in other examples certain cores may not have an associated worker thread and/or certain cores may include more than one worker thread (e.g. to exploit multi-threading capabilities of a single core such as Intel's hyperthreading or ARM's Simultaneous Multi-Threading). In addition, at this time each of REE global scheduler 151, 152, 153 and 154 are depicted in a dashed line. As discussed, above the REE global scheduler may be executing on any one or more of the cores.

Figure 1B:
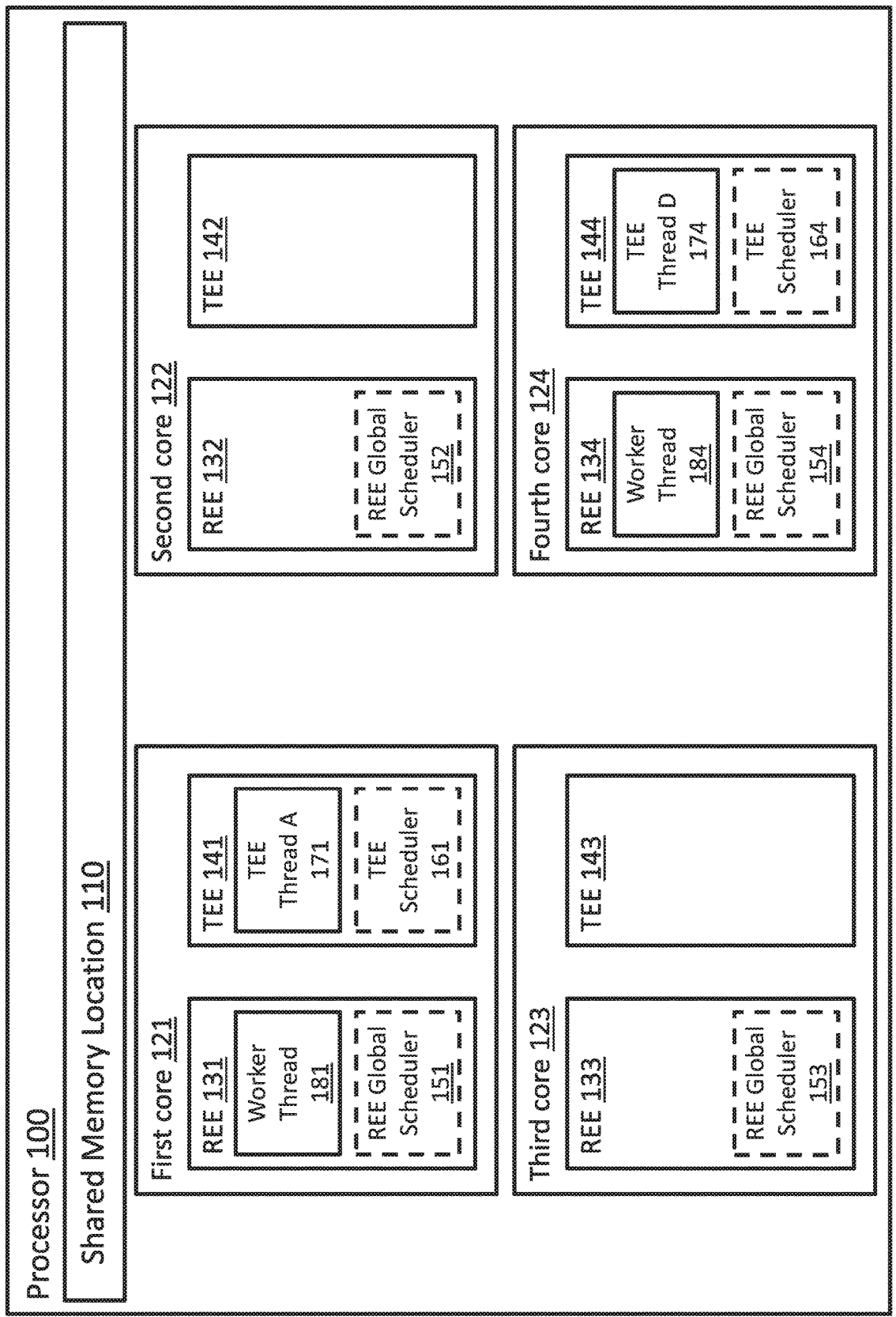
FIG. 1B: Schematically illustrates a multicore processor configured to operate according to teachings of the disclosure after a first execution of worker threads.

FIG. 1B shows the multicore processor 100 after the worker thread 181 and 184 have emitted calls to the TEE to cause execution of the TEE on the same core as each of the worker threads. In other words in FIG. 1B the TEE is executing in TEE 141 of the first core 121 and in TEE 144 of the fourth core 124. These calls can take the form of a SMC to a secure monitor (not depicted) of the TEE. At this time TEE scheduler 161 and 164 are depicted in a dash line. In a similar manner to the REE global scheduler, the TEE scheduler can be exclusively executing in the TEE 141 of the first core 121, be exclusively executing in the TEE 142 of the second core 122, be exclusively executing in the TEE 143 of the third core 123, be exclusively executing in the TEE 134 of the fourth core 124, be dynamically migrated between the TEEs 141, 142, 143 and 144 of the four cores 121, 122, 123 and 124, be executing in a multi-threaded state across both TEEs 141, 142, 143 and 144 of the four cores 121, 122, 123 and 124 or any combination of the aforementioned possibilities. In FIG. 1B the TEE scheduler is depicted as a dashed line as TEE scheduler 161 and TEE scheduler 164. As discussed above, the TEE scheduler may be executing on any combination of the two cores. At some point prior to FIG. 1B the TEE scheduler 161, 164 has scheduled TEE thread A 171 to execute in TEE 141 on the first core 121 and TEE thread D 174 to execute in TEE 144 on the fourth core 124.

Figure 1C:
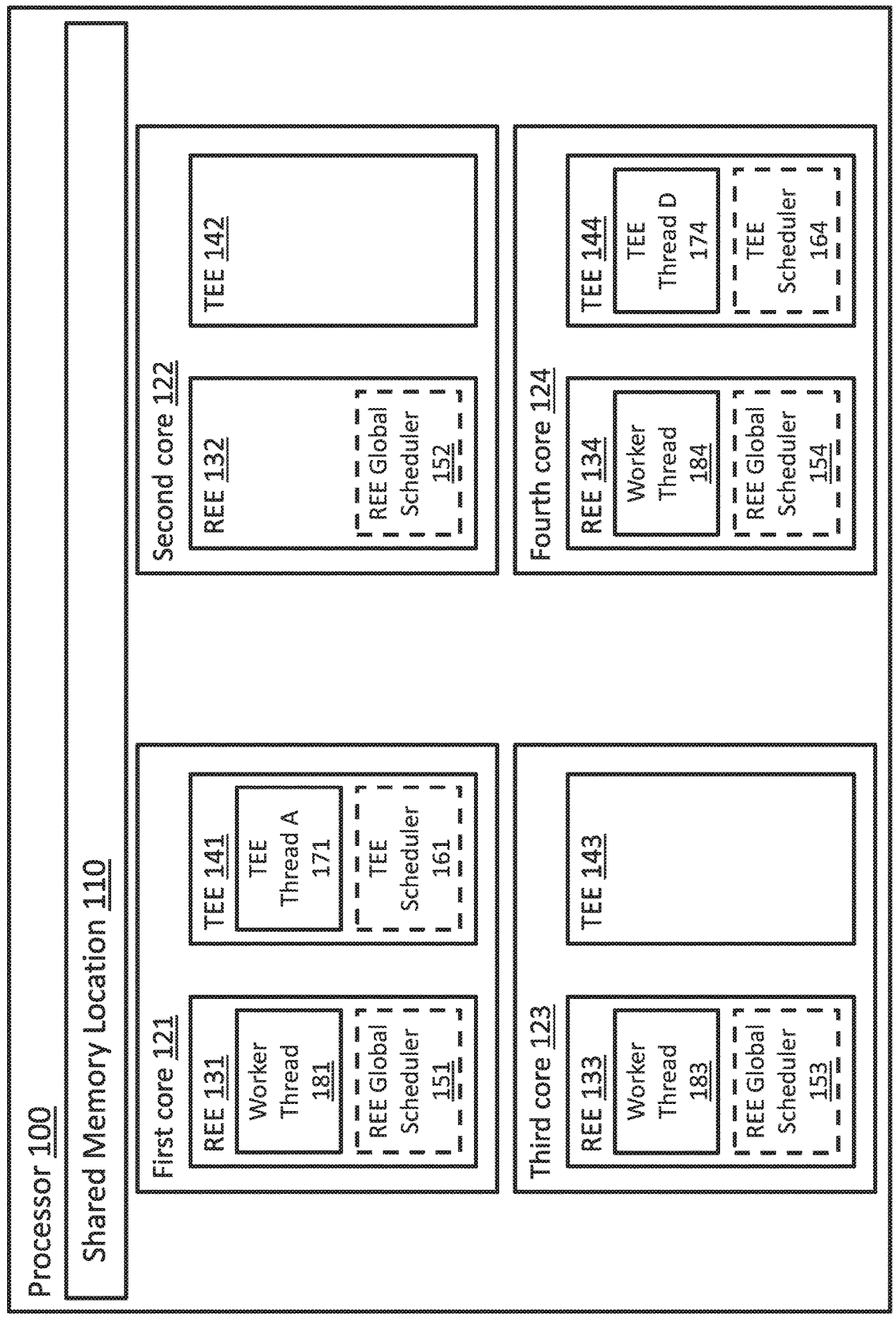
FIG. 1C: Schematically illustrates a multicore processor configured to operate according to teachings of the disclosure after activation of an additional worker thread following return to one or more worker threads.

FIG. 1C shows the multicore processor 100 some further time later. At some point prior to FIG. 1C one or both of TEE 141 or TEE 144 has returned to their respective worker thread 181 or 184. This return has triggered a comparison of whether the "correct" number of worker threads are activated which in turn has led to worker thread 183 being activated in addition to already activated worker threads 181 and 184. This comparison process which can lead to the activation or deactivation of worker threads is discussed in further detail with respect to FIG. 2 below.

Figure 1D:
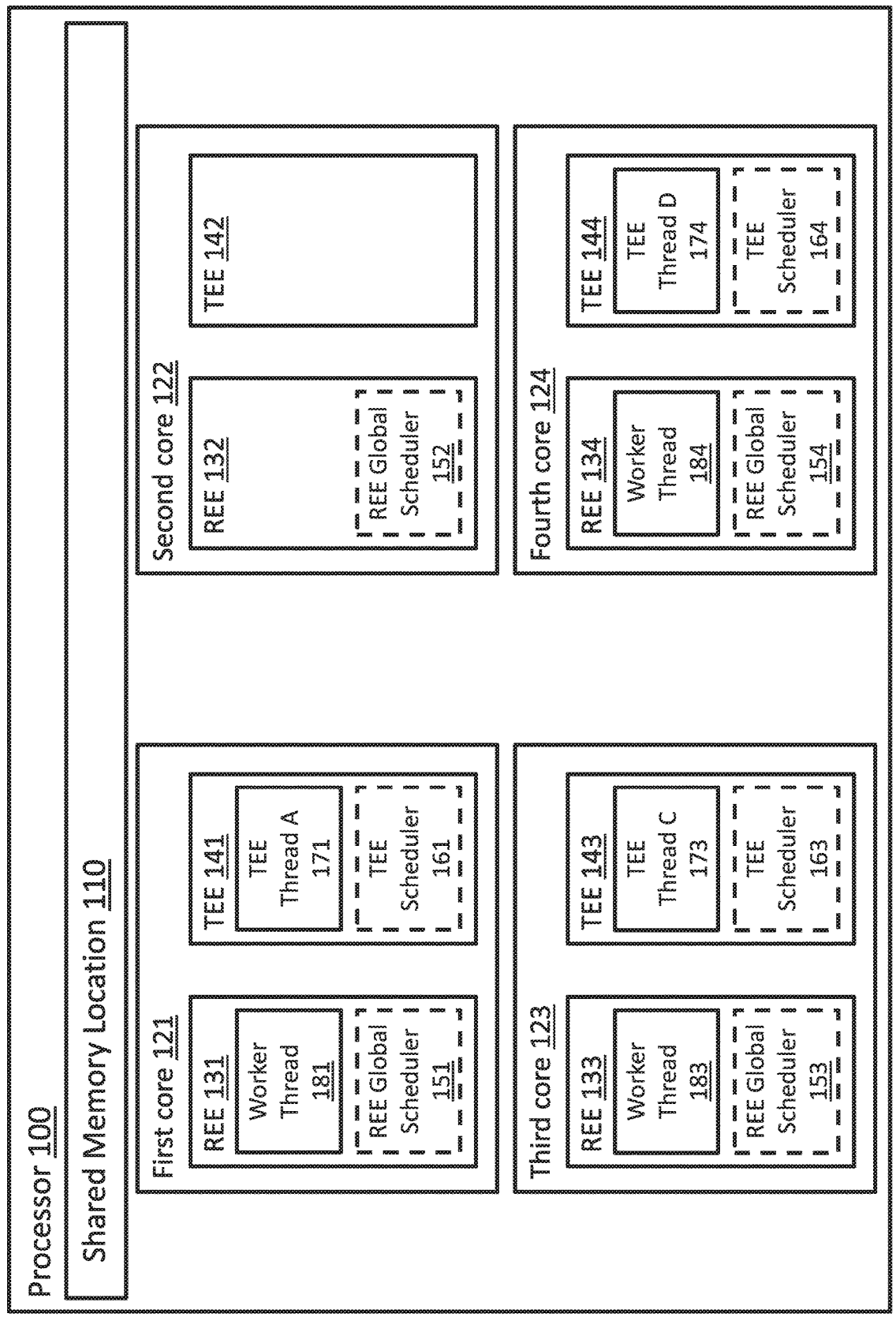
FIG. 1D: Schematically illustrates a multicore processor configured to operate according to teachings of the disclosure after execution of the additional worker thread.

FIG. 1D shows the multicore processor 100 after worker thread 183 has emitted a call to cause execution of TEE 143 on the same core, third core 123, as the core on which worker thread 183 is executing. As can been seen the TEE scheduler is now shown in dashed line as each of 161, 163 and 164. As discussed in relation to FIG. 1B the TEE scheduler may be executing on any combination of the active TEEs in this case TEE 141, 143 or 144. Since an additional TEE 143 is now active, the TEE scheduler 161, 163, 164 is able to execute an additional thread, TEE thread C 173, in the newly executing TEE 143, simultaneous with TEE thread A 171 executing in TEE 141 and TEE thread D 174 executing in TEE 144.

Figure 1E:
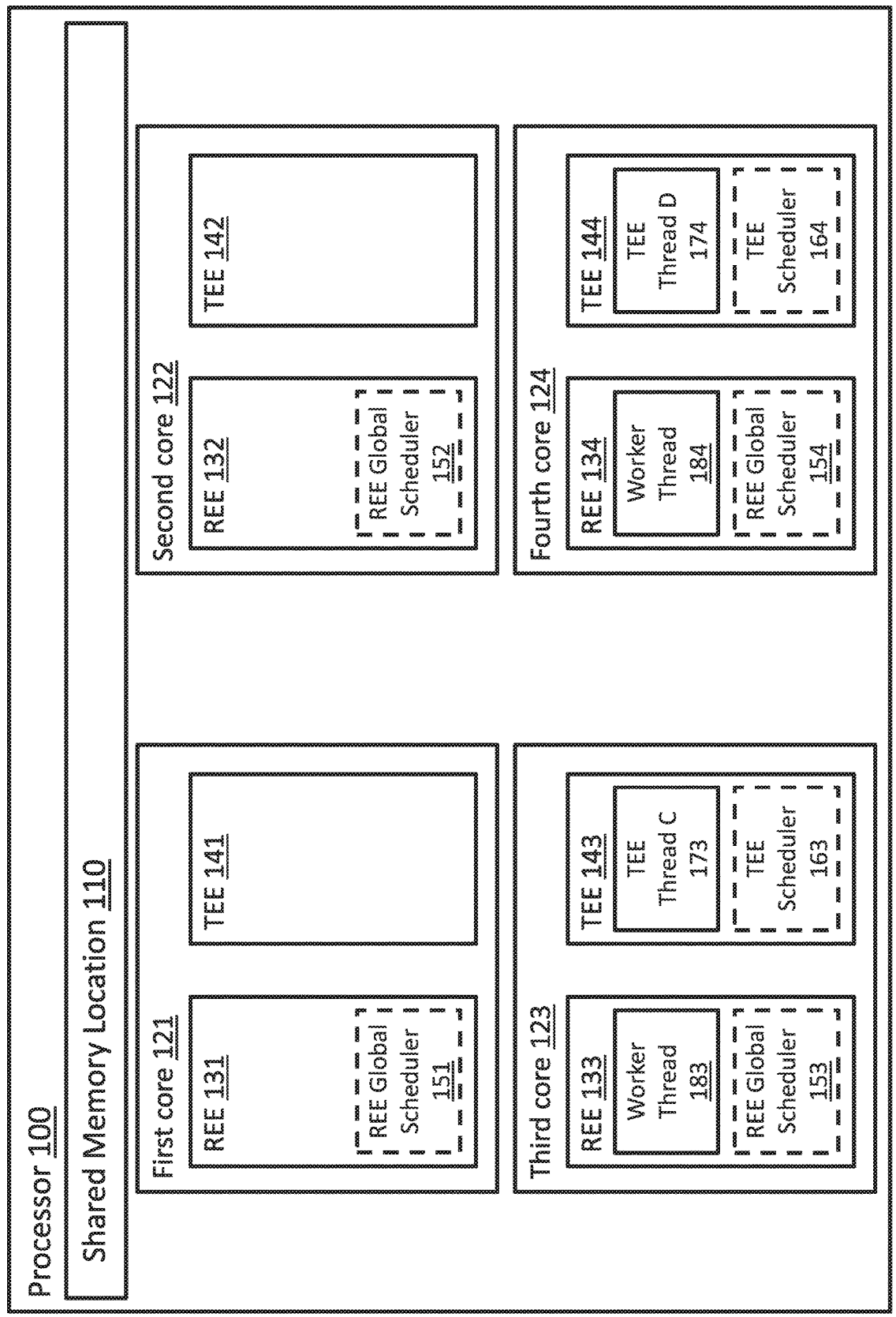
FIG. 1E: Schematically illustrates a multicore processor configured to operate according to teachings of the disclosure after deactivation of a worker thread following return to one or more work threads.

FIG. 1E shows the multicore processor 100 at some further time where, after a further return from one of TEE 141, TEE 143 or TEE 144 it is determined as the result of a comparison that there are too many worker threads and accordingly one, in this case worker thread 181, is deactivated. Therefore, no further calls will be issued for execution of TEE 141 and accordingly, neither TEE scheduler 161 nor TEE Thread A 171 will continue to be executed.

Figure 1F:
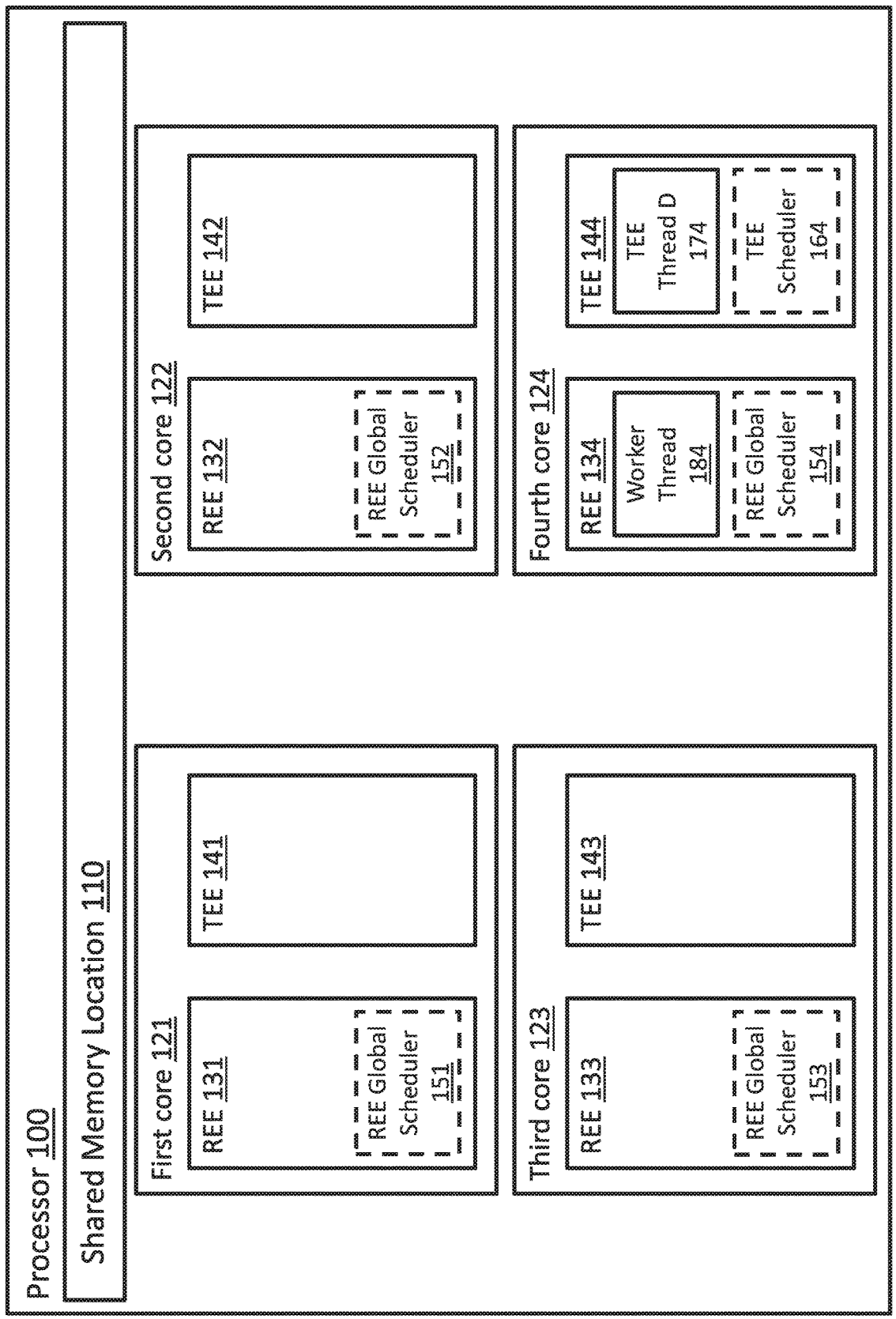
FIG. 1F: Schematically illustrates a multicore processor configured to operate according to teachings of the disclosure after deactivation of a further worker thread following return to one or more work threads.

FIG. 1F shows the multicore processor 100 at some further time where, after a further return from one of TEE 143 or TEE 144 it is again determined as the result of a comparison that there are too many worker threads and accordingly one, in this case worker thread 183, is deactivated. Therefore, no further calls will be issued for execution of TEE 143 and accordingly, neither TEE scheduler 163 nor TEE Thread C 173 will continue to be executed.

It is to be appreciated that while four TEE Threads have been described as TEE thread A 171, TEE thread B 172, TEE thread C 173, and TEE thread D 174, this does not necessarily imply that these threads are dissimilar from each other. In some examples, two or more of these TEE threads (e.g. TEE thread B 172 and TEE thread D 174) are multiple threads of the same multi-threaded trusted application simultaneously executing across the various TEE execution contexts. In other examples, two or more of these TEE threads may belong to different trusted applications (e.g. TEE thread A 171 belonging to a first trusted application and TEE thread D 174 belonging to a second trusted application).

Figure 2:
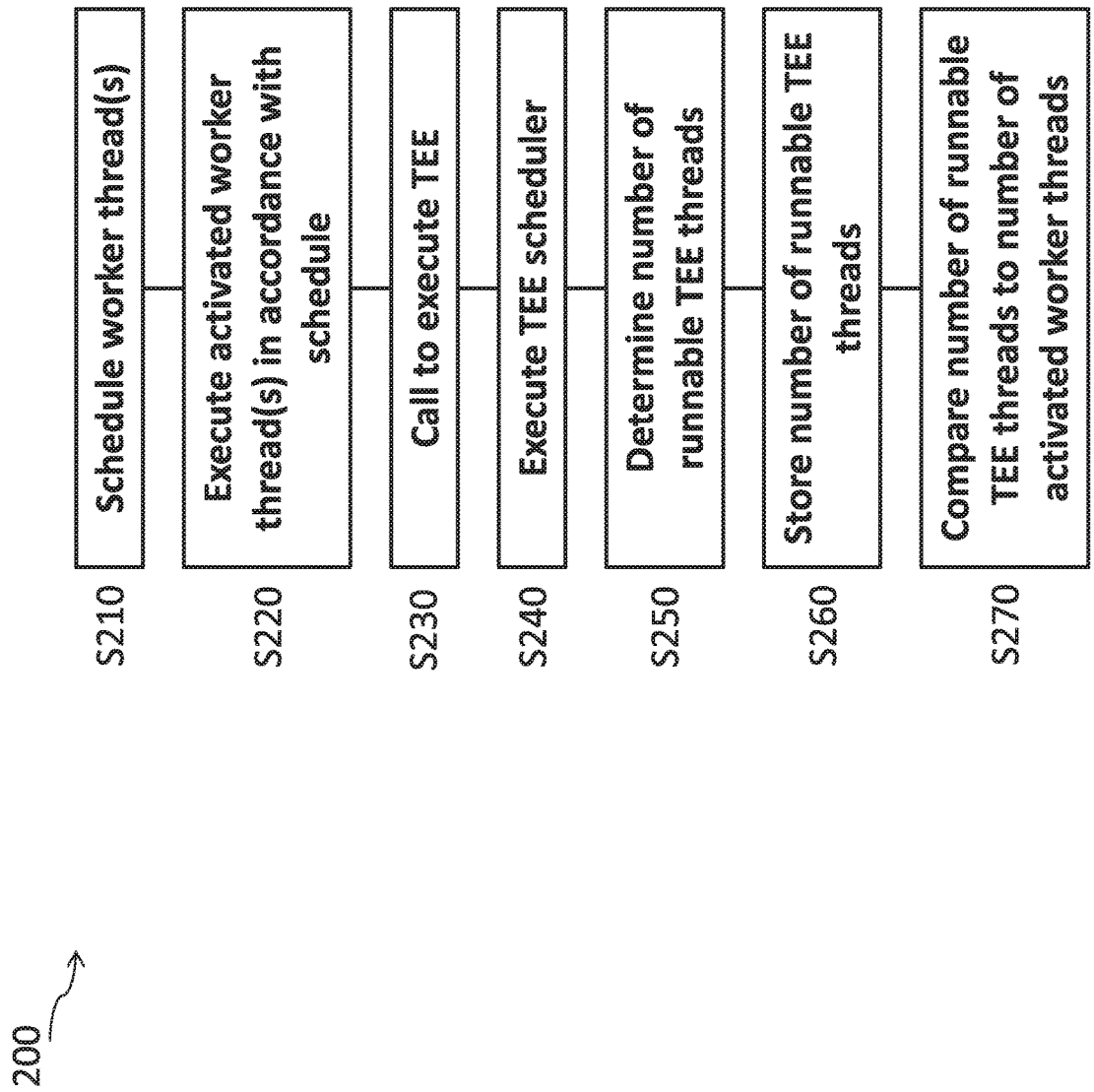
FIG. 2: Schematically illustrates a method for scheduling execution of one or more execution contexts of a multi-threaded Trusted Execution Environment according to teachings of the disclosure.

FIG. 2 shows a schematic illustration of a method 200 for scheduling execution of one or more execution contexts of a multi-threaded Trusted Execution Environment according to teachings of the disclosure. It will be understood that the method can be applied to multicore processors of the type depicted in FIGS. 1A to 1E. The method includes the following steps.

At step S210, a REE global scheduler schedules activated worker thread(s) for execution in their respective REE on the cores of the multicore processor. The method then continues to step S220.

At step S220, an activated worker thread is executed in accordance with the schedule determined by the REE global scheduler. The method then continues to step S230.

At step S230, the executing activated worker thread makes a call to the TEE to cause execution of an instance of the TEE on the same core on which the worker thread is executing. The method then continues to step S240.

At step S240, the TEE scheduler is executed in the TEE. In some examples, the TEE scheduler is executed as part of the process of entry into the TEE. Additionally or alternatively, the TEE scheduler is periodically executed in the TEE. In some examples, the TEE scheduler is partly or fully executed on the particular newly executing instance of the TEE. In other examples, the TEE scheduler may be executed, or continue executing, on another instance of the TEE. In some examples, a check is made on entry to the TEE to ensure at least one instance of the TEE is executing the TEE scheduler and responsive to a negative determination the TEE scheduler is executing on the newly executing instance of the TEE. The method then continues to step S250.

At step S250, the TEE scheduler determines the number of runnable TEE threads. The use of the term "runnable" is intended to convey that the threads are either presently, or are awaiting, execution in the TEE. In some examples, the TEE scheduler determines the number of runnable TEE threads upon invocation of the TEE scheduler. Additionally or alternatively, the TEE scheduler periodically determines the number of runnable TEE threads and/or determines the number the number of runnable TEE threads responsive to an event which (probabilistically) changes the number of runnable threads such as a TEE thread completing a task.

An otherwise runnable thread which has reached a "blocked" state (e.g. while the thread is waiting for (exclusive) access to data or for another thread to complete) may, in some examples, not be included in the number of runnable threads.

By way of an illustrative example, a first TEE thread, a second TEE thread and a third TEE thread are provided in a TEE. Responsive to each of the first TEE thread and the second TEE thread sending a request to the third TEE thread such that both the first TEE thread and the second TEE thread are blocked awaiting a response from the third TEE thread, the TEE scheduler removes the first TEE thread and the second TEE thread from the number of runnable TEE threads and ensures that the third TEE thread is included in the number of runnable TEE threads. In other words the number of runnable threads is net reduced by one.

At some point in time later, responsive to the first TEE thread or the second TEE thread receiving a response from the third TEE thread and hence becoming unblocked, the TEE scheduler re-includes the first TEE thread or the second TEE thread which has become unblocked.

As another illustrative example, where a TEE thread calls a sleep function, the TEE thread which calls the sleep function is removed from the number of runnable TEE threads. In some examples, the corresponding wakeup time is communicated to the REE (e.g. in addition to being notified to the TEE scheduler) to ensure that at least one worker thread is activated to wake up the TEE at the wake up time. In some examples, the wakeup is handles in the REE by the REE global scheduler.

In any case, once the number of runnable threads has been determined the method then continues at step S260

At step S260, the TEE scheduler stores the determined number of runnable TEE threads in a location accessible to threads executing in the REE. In some examples, the number of runnable TEE threads is only accessible with threads with an elevated privilege such as kernel threads. The method then continues to step S270.

As step S270, at some point after execution has returned back from the TEE to the calling worker thread, the worker thread directly or indirectly (i.e. by calling a service which returns the value) retrieves the number of runnable TEE threads and compares this to the number of currently activated worker threads in the REE spread across the cores of the multicore processor. In some examples, the comparison is performed responsive to return of the call from the TEE back to the worker thread. Additionally or alternatively, in some examples the comparison is performed on invocation of the worker thread, for example, when executed according to the scheduler determined by the REE global scheduler. Various actions which may be taken responsive to this comparison are discussed in further detail in relation to FIG. 3 discussed below.

Figure 3:
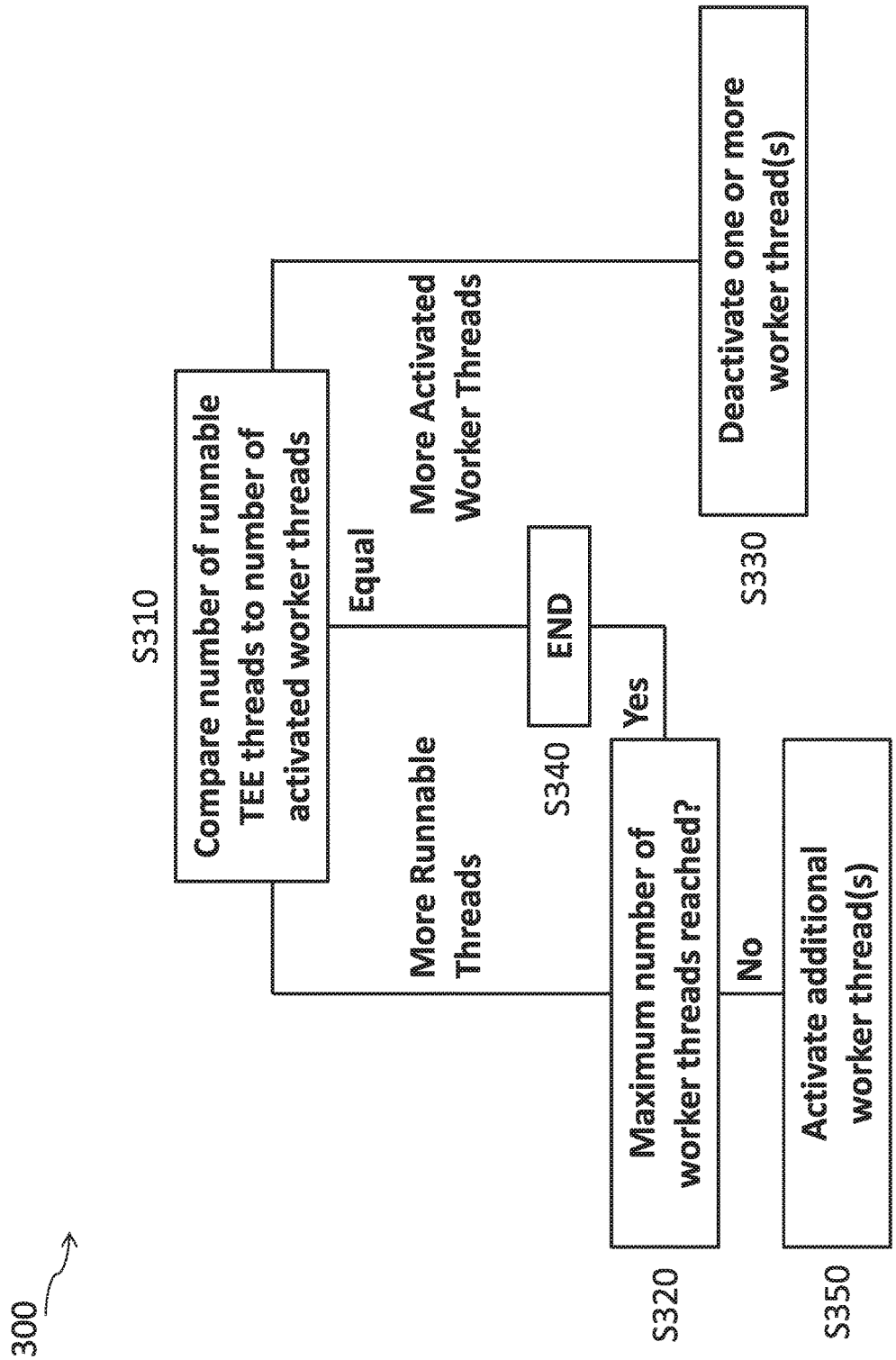
FIG. 3: Schematically illustrates a method where the number of worker threads is adjusted in accordance with a comparison with the number of runnable TEE threads.

FIG. 3 shows a schematic illustration of a method 300 where the number of worker threads is adjusted in accordance with a comparison with the number of runnable TEE threads. It will be understood that the method can be applied to multicore processors of the type depicted in FIGS. 1A to 1E. The method includes the following steps.

Method 300 starts at step S310 which, in some examples, be considered as equivalent to step S270 as depicted in method 200 in FIG. 2. At step S310 a worker thread retrieves the number of runnable TEE threads and compares this to the number of currently activated worker threads in the REE spread across the cores of the multicore processor. If the comparison determines that there are more runnable TEE threads than there are activated worker threads the method continues to step S320. If the comparison determines that there are more activated worker threads than runnable TEE threads the method continues to step S330. If the comparison determines that there are an equal number of runnable TEE threads to activated worker threads than the method continues to and ends at step S340.

At step S320 a check is made to determine if a maximum number of worker threads has been reached. In some examples, the number of worker threads is explicitly limited to a predetermined number and/or the cores on which activated worker threads are permitted to be on are limited to a subset of the plurality of cores of the multicore processor. These limitations may be a pre-set variable of the device and/or may be dynamically adjusted during execution. In other examples, the maximum number can be considered of a more implicit limit, for example, when there is already one activated worker thread per core. Responsive to a determination that the maximum number of worker threads has not been reached the method then continues to step S350. Responsive to a determination that the maximum number of worker threads has been reached the method continues to and ends at step S340.

At step S350, an additional worker thread is activated. In some examples, this takes the form of a deactivated worker thread being activated. In other examples, an additional worker thread is provisioned and activated.

At step S330, a worker thread is deactivated. In some examples, the worker thread is simply deactivated. In other examples, the worker thread is deprovisioned as well as deactivated. In some examples, the worker thread which performs the comparison in S310 is itself disabled (e.g. for computational simplicity and/or security reasons as the worker thread may have higher privileges to affect its own operation). In other examples a different worker thread from the worker thread which performed the comparison is disabled. In some examples, where the number of runnable TEE threads has dropped to zero, all worker threads are deactivated.

Figure 4:
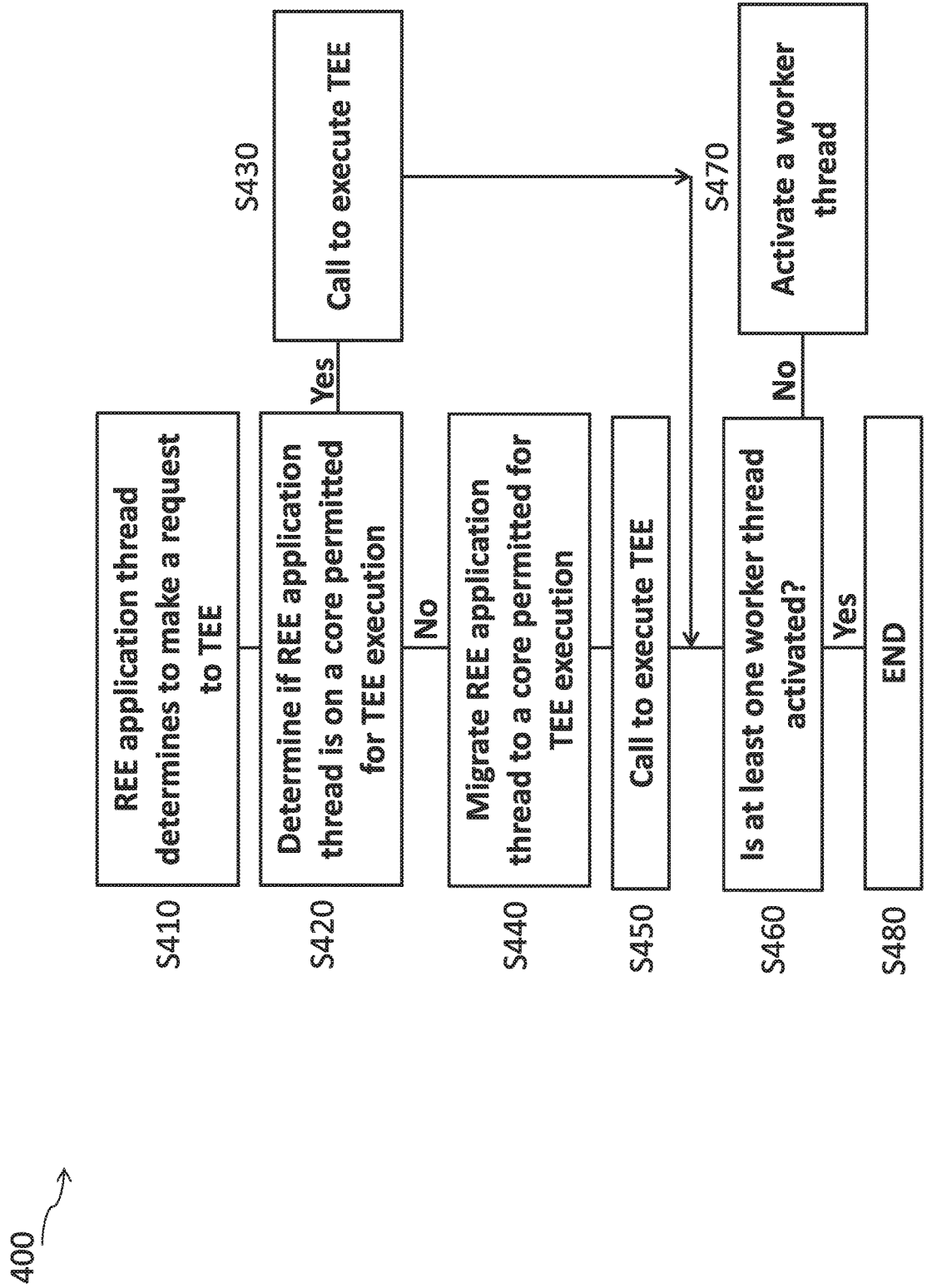
FIG. 4: Schematically illustrates a method to ensure that the device will periodically return to the TEE following an initial request made by an REE application to the TEE.

FIG. 4 shows a schematic illustration of a method 400 to ensure that the device will periodically return to the TEE following an initial request made by an REE application to the TEE. It will be understood that the method can be applied to multicore processors of the type depicted in FIGS. 1A to 1E. The method includes the following steps.

At step S410 an REE application determines that it wishes to make a request to the TEE. This may be, for example, to request a service from a Trusted Application (e.g. biometric authentication) or to request a particular piece of information which can be retrieved via the TEE. The method continues to step S420.

At step S420, a determination is made to determine if the REE application thread is executing on a core permitted for TEE execution. In some examples, this determination is performed by the REE application thread itself. In other examples it is performed by a separate service. Responsive to a positive determination the method proceeds to step S430. Responsive to a negative determination the method continues to step S440. In some examples, step S420 is entirely skipped and the method immediately continues to step S430.

At step S430, the REE application thread emits a call to cause execution of the TEE on the same core that the REE application thread is executing on. The method continues to step S460.

At step S440, the REE application thread is migrated to a core permitted for TEE execution. The method then continues to step S450.

At step S450, the REE application thread emits a call to cause execution of the TEE on the new core that the REE application thread is now executing on. The method continues to step S460.

At step S460, which occurs after return from the TEE back to the REE application thread, a determination is made to ensure that at least one worker thread is activated. Responsive to a negative determination the method continues to step S470. Responsive to a positive determination the method continues to step S480 where the method ends.

At step S470, a worker thread is activated. In some examples, the worker thread is activated on the same core that the REE application thread is executing on. In other examples, the worker thread is activated on a different core to the core on which the REE application thread is executing which is also on a core permitted for TEE execution.

Figure 5:
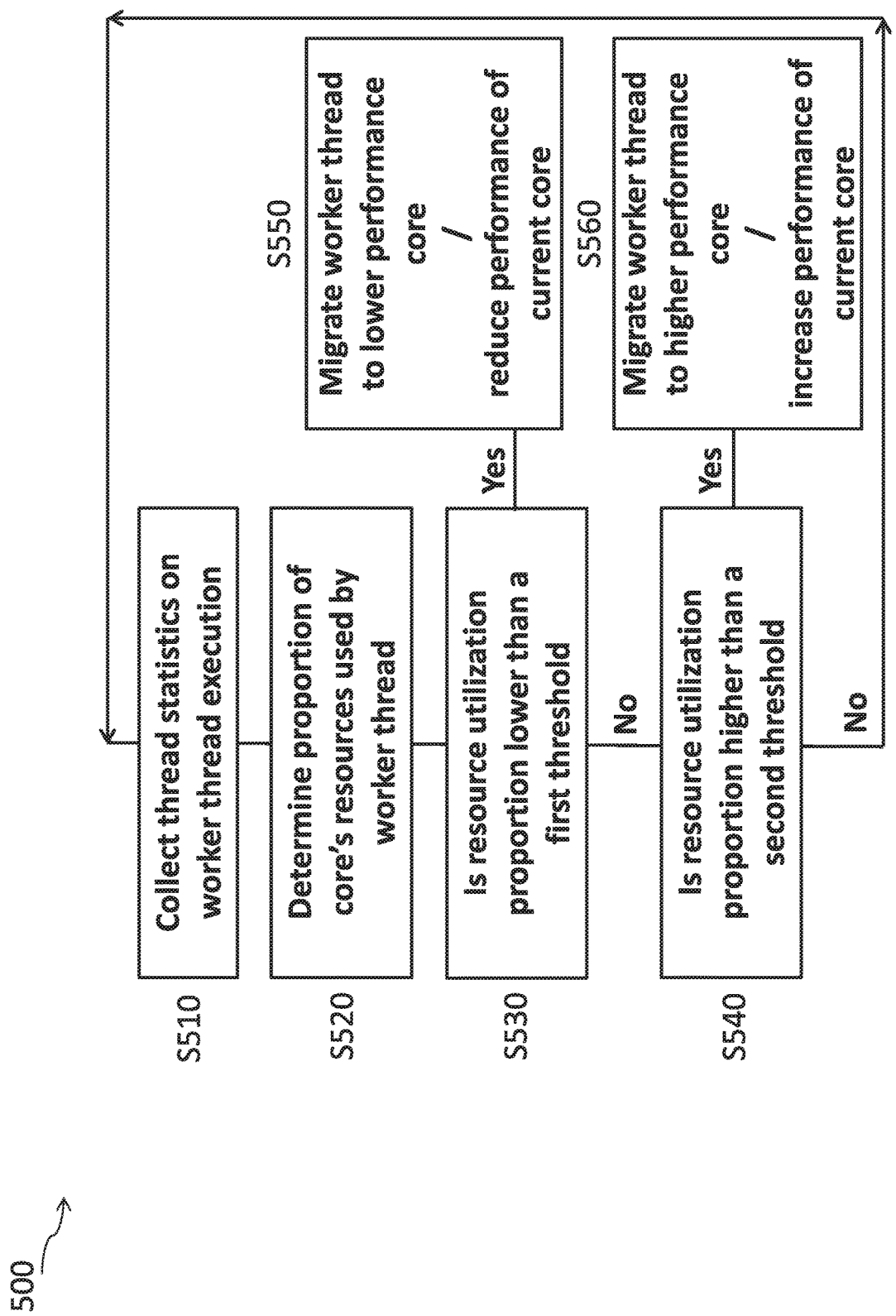
FIG. 5: Schematically illustrates a method of collecting and utilizing thread statistics using a REE Global Scheduler to migrate or adjust the core that a worker thread is executing on to lower or higher performance according to teachings of the disclosure.

FIG. 5 shows a schematic illustration of a method 500 of collecting and utilizing thread statistics using a REE global scheduler to migrate or adjust the core that a worker thread is executing on to lower or higher performance according to teachings of the disclosure. It will be understood that the method can be applied to multicore processors of the type depicted in FIGS. 1A to 1E. The method includes the following steps.

At step S510, a REE global scheduler 151, 152, 153, 154 collects thread statistics on the execution of a worker thread 181, 182, 183, 184, where the TEE 141, 142, 143, 144 is executing on the same core that is executing the worker thread 181, 182, 183, 184, and where the execution of the TEE 141, 142, 143, 144 is transparently extended through the worker thread 181, 182, 183, 184 (e.g. the operations submodule appears to be the same thread as the worker thread to the REE and/or REE global scheduler) so that execution of the TEE 141, 142, 143, 144 appears to be part of the worker thread 181, 182, 183, 184 to the REE global scheduler and accordingly execution of the TEE 141, 142, 143, 144 is accounted for in the thread statistics of the execution of the worker thread 181, 182, 183, 184. The method then continues to step S520.

At step S520, the REE global scheduler determines the proportion of resources used by the worker thread 181, 182, 183, 184 (including the embedded TEE 141, 142, 143, 144 utilization), by means of the collected thread statistics, on the core on which the worker thread 181, 182, 183, 184/TEE 141, 142, 143, 144 are executing. The method then continues to step S530.

At step S530, the REE global scheduler checks if the worker thread 181, 182, 183, 184/TEE 141, 142, 143, 144 resource utilization proportion on the core is lower than a first threshold value. In response to a positive determination the method continues to step S550. In response to a negative determination the method continues to step S540.

At step S550, responsive to the determination that the worker thread 181, 182, 183, 184/TEE 141, 142, 143, 144 resource utilization proportion is lower than the first threshold value, the REE global scheduler will migrate the worker thread 181, 182, 183, 184 to a lower performance core and/or reduce the performance of the current core. In the present example, the migration of worker thread 181, 182, 183, 184 will result in the TEE 141, 142, 143, 144 subsequently also being executed on the same new/modified core since when the worker thread 181, 182, 183, 184 next emits a call for execution of the TEE 141, 142, 143, 144 both the worker thread 181, 182, 183, 184 and the TEE 141, 142, 143, 144 will be executed on the same new/modified core which the worker thread 181, 182, 183, 184 is executing on.

At step S540, responsive to the determination that the worker thread 181, 182, 183, 184/TEE 141, 142, 143, 144 resource utilization proportion is higher than the first threshold value, the REE global scheduler checks if the worker thread 181, 182, 183, 184/TEE 141, 142, 143, 144 resource utilization proportion on the core is higher than a second threshold value. In response to a positive determination the method continues to step S560. In response to a negative determination the method returns to step S510 where a new round of collection of thread statistics and checking against thresholds is performed.

At step S560, responsive to the determination that the worker thread 181, 182, 183, 184/TEE 141, 142, 143, 144 resource utilization proportion is higher than the second threshold value, the REE global scheduler will migrate the worker thread 181, 182, 183, 184 to a higher performance core and/or increase the performance of the current core. In the present example, the migration of worker thread 181, 182, 183, 184 will result in the TEE 141, 142, 143, 144 subsequently also being executed on the same new/modified core since when the worker thread 181, 182, 183, 184 next emits a call for execution of the TEE 141, 142, 143, 144 both the worker thread 181, 182, 183, 184 and the TEE 141, 142, 143, 144 will be executed on the same new/modified core which the worker thread 181, 182, 183, 184 is executing on.

It is to be understood that in some examples the difference in performance between cores may originate from differences in the hardware of the cores themselves, for example, in a heterogeneous multicore processor. In other examples, the difference in performance may arise from difference in the voltage, frequency or power state of the cores.

In some examples, rather than migrating the worker thread 181, 182, 183, 184 between cores the REE global scheduler may instead adjusts the voltage, frequency or power state of the core on which it is executing to increase or decrease the performance of the core in response to resource utilization proportions on the core being determined to be exceeded or undershot.

It is to be understood that while in the present example the first and second threshold are depicted as static, in other examples these thresholds may be dynamically set by the REE global scheduler to take into account, among other things, the resource utilization of other threads, the battery status of the device and/or the power/performance status of each of the plurality of cores.

FIG. 6 schematically illustrates an example of an electronic device 600 which can be used to implement any of the teachings described above including method 200, method 300, method 400 or method 500. The device has processing circuitry 610 for performing data processing in response to program instructions, data storage 620 for storing data and instructions to be processed by the processing circuitry 610. The processing circuitry 610 can correspond to the multicore processor 100 described above. In some examples, the processing circuitry 610 includes one or more caches for caching recent data or instructions. The data storage 620 may have a secure region 630 which is protected by hardware mechanisms (e.g. using memory protection units or security mechanisms providing a TEE) or by software mechanisms (e.g. encryption), so that data stored in a secure region 630 is inaccessible to software not executing within a trusted environment. The device 600 may have a communications interface 660 for communicating with external devices. For example communications interface 660 could use any other range of different communication protocols, such as Ethernet, WiFi®, Bluetooth®, ZigBee®, etc. The device may have one or more sensors 650 for sensing certain external conditions such as temperature, pressure, the proximity of a nearby user, etc. The specific sensors 650 provided may depend on the purpose of the device. For example sensors 650 may include sensors which aid in biometric authentication such as a fingerprint sensor and a face recognition camera system. It will be appreciated that FIG. 6 is merely an example of possible hardware that may be provided in the device and other components may also be provided. For example, some devices for which user interaction is expected may be provided with one or more user input/output device(s) 640 to receive input from a user or to output information to a user.

The methods discussed above may be performed under control of a computer program executing on a device. Hence a computer program may comprise instructions for controlling a device to perform any of the methods discussed above. The program can be stored on a storage medium. The storage medium may be a non-transitory recording medium or a transitory signal medium.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative teachings of the disclosure have been described in detail herein with reference to the accompanying drawings, it is to be understood that the invention is not limited to those precise teachings, and that various changes and modifications can be effected therein by one skilled in the art without departing from the scope and spirit of the invention as defined by the appended claims.

Further examples of feature combinations taught by the present disclosure are set out in the following numbered clauses:

1. A trusted execution environment scheduling method for a device comprising a multicore processor, the processor operable to execute a rich execution environment (REE) and a trusted execution environment (TEE), the method comprising:
    providing a REE global scheduler in the REE, the REE global scheduler operable to schedule threads for execution in the REE;
    providing a TEE scheduler in the TEE, the TEE scheduler operable to schedule threads for execution in the TEE, wherein the TEE scheduler determines a number of runnable TEE threads which are either presently, or are awaiting, execution in the TEE and stores the number of runnable TEE threads in a location accessible to threads executing in the REE;
    providing a plurality of worker threads in the REE, the worker threads being in an activated state or in an deactivated state,
        wherein when an activated worker thread of the plurality of worker threads is executed according to the schedule of the REE global scheduler the worker thread makes a call to the TEE to cause execution of the TEE on the same core as the worker thread, and
        wherein the worker thread retrieves the number of runnable TEE threads and compares the retrieved number of runnable TEE threads to the number of currently activated worker threads.

2. The method of clause 1, wherein the TEE scheduler determines the number of runnable TEE threads upon invocation of the TEE scheduler.

3. The method of clause 1 or clause 2 wherein the worker thread performs the comparison upon return of the call from the TEE back to the worker thread.

4. The method of any preceding clause, wherein the worker thread performs the comparison upon invocation of the worker thread.

5. The method of any preceding clause, wherein in response to a determination that the number of runnable TEE threads is greater than the number of currently activated worker threads, the worker thread activates additional worker threads.

6. The method of any preceding clause, wherein in response to a determination that the number of runnable TEE threads is fewer than the number of currently activated worker threads, the worker thread deactivates itself.

7. The method of any preceding clause, further comprising concurrently executing the TEE on both a first core and a second core of the multicore processor as a result of calls to the TEE from both a first activated worker thread located on the first core and from a second activated worker thread located on a second core.

8. The method of clause 7, wherein a first TEE thread executes in the TEE on the first core and a second TEE thread executes in the TEE on the second core, wherein the first TEE thread is a thread belonging to a first trusted application and the second TEE thread is a thread belonging to a second trusted application.

9. The method of clause 7, wherein a first TEE thread executes in the TEE on the first core and a second TEE thread executes in the TEE on the second core, wherein the first TEE thread and the second TEE thread belong to the same multithreaded trusted application.

10. The method of any preceding clause, wherein the REE global scheduler collects thread statistics on the execution of REE threads, wherein when a worker thread calls the TEE the execution of the TEE is transparently extended through the calling worker thread so that the execution of the TEE appears to be part of the worker thread to the REE global scheduler and execution of the TEE resulting from the call of the worker thread is accounted for in the thread statistics of the worker thread.

11. The method of clause 10, wherein in response to the REE global scheduler determining, using the thread statistics, that the worker thread is utilizing a low or a high proportion of the resources of the core it is executing on, the REE global scheduler decreases or increases the voltage and/or frequency of the core the worker thread is executing on respectively.

12. The method of clause 10 or clause 11, wherein the multicore processor is a heterogeneous multicore processor where at least one of the cores of the heterogeneous multicore processor has different performance characteristics to another one of the cores of the heterogeneous multicore processor, and
  wherein in response to the REE global scheduler determining, using the thread statistics, that the worker thread is utilizing a low or high proportion of the resources of the core it is executing on, the REE global scheduler migrates the worker thread to a lower or higher performance core respectively.

13. The method of any preceding clause, further comprising providing a first TEE thread, a second TEE thread and a third TEE thread in the TEE, wherein responsive to each of the first TEE thread and the second TEE thread sending a request to the third TEE thread such that both the first TEE thread and the second TEE thread are blocked awaiting a response from the third TEE thread, the TEE scheduler removes the first TEE thread and the second TEE thread from the number of runnable TEE threads and ensures that the third TEE thread is included in the number of runnable TEE threads.

14. The method of clause 13, wherein in response to the first TEE thread or the second TEE thread receiving a response from the third TEE thread and hence becoming unblocked, the TEE scheduler re-includes the first TEE thread or the second TEE thread which has become unblocked.

15. The method of any preceding clause, wherein when the number of runnable TEE threads drops to zero, all worker threads are deactivated.

16. The method of any preceding clause, wherein the number of worker threads are limited to a predetermined number and/or the cores on which the worker threads are permitted are restricted to a predetermined subset of the plurality of cores of the multicore processor.

17. The method of any preceding clause, wherein when a request is made from an REE application thread to the TEE, the REE application thread itself initially calls the TEE on the same core that the REE application is executing on, and upon return of the call a check is made to determine whether at least one worker thread is activated and responsive to a negative determination activating at least one worker thread.

18. The method of clause 17, wherein the cores on which the worker threads are permitted are restricted to a predetermined subset of the plurality of cores of the multicore processor, and wherein prior to the call by the REE application thread to the TEE, the REE application thread is migrated to one of the predetermined subset of the plurality of cores.

19. The method of any preceding clause, wherein when a TEE thread calls a sleep function, the TEE thread which calls the sleep function is removed from the number of runnable TEE threads and the corresponding wakeup time is communicated to the REE to wake up the TEE at the wakeup time.

20. The method of any preceding clause, wherein the TEE utilizes a microkernel.

21. A computer program to control a device to perform the method of any preceding clause.

22. At least one computer-readable medium comprising the computer program of clause 21.

23. A device comprising:
  a multicore processor operable to execute a rich execution environment (REE) and a trusted execution environment (TEE);
  data storage storing at least one computer program for controlling the processing circuitry to perform the method of any of clauses 1 to 20.

The invention claimed is:

1. A trusted execution environment scheduling method for a device comprising a multicore processor, the processor operable to execute a rich execution environment (REE) and a trusted execution environment (TEE), the method comprising:
  providing a REE global scheduler in the REE, the REE global scheduler operable to schedule threads for execution in the REE;
  providing a TEE scheduler in the TEE, the TEE scheduler operable to schedule threads for execution in the TEE, wherein the TEE scheduler determines a number of runnable TEE threads which are either presently, or are awaiting, execution in the TEE and stores the number of runnable TEE threads in a location accessible to threads executing in the REE;
  providing a plurality of worker threads in the REE, the worker threads being in an activated state or in an deactivated state,
    wherein when an activated worker thread of the plurality of worker threads is executed according to the schedule of the REE global scheduler the worker thread makes a call to the TEE to cause execution of the TEE on the same core as the worker thread, and
    wherein the worker thread retrieves the number of runnable TEE threads and compares the retrieved number of runnable TEE threads to the number of currently activated worker threads.

2. The method of claim 1, wherein the TEE scheduler determines the number of runnable TEE threads upon invocation of the TEE scheduler.

3. The method of claim 1 wherein the worker thread performs the comparison upon return of the call from the TEE back to the worker thread.

4. The method of claim 1, wherein the worker thread performs the comparison upon invocation of the worker thread.

5. The method of claim 1, wherein in response to a determination that the number of runnable TEE threads is greater than the number of currently activated worker threads, the worker thread activates additional worker threads.

6. The method of claim 1, wherein in response to a determination that the number of runnable TEE threads is fewer than the number of currently activated worker threads, the worker thread deactivates itself.

7. The method of claim 1, further comprising concurrently executing the TEE on both a first core and a second core of the multicore processor as a result of calls to the TEE from both a first activated worker thread located on the first core and from a second activated worker thread located on a second core.

8. The method of claim 7, wherein a first TEE thread executes in the TEE on the first core and a second TEE thread executes in the TEE on the second core, wherein the first TEE thread is a thread belonging to a first trusted application and the second TEE thread is a thread belonging to a second trusted application.

9. The method of claim 7, wherein a first TEE thread executes in the TEE on the first core and a second TEE thread executes in the TEE on the second core, wherein the first TEE thread and the second TEE thread belong to the same multithreaded trusted application.

10. The method of claim 1, wherein the REE global scheduler collects thread statistics on the execution of REE threads, wherein when a worker thread calls the TEE the execution of the TEE is transparently extended through the calling worker thread so that the execution of the TEE appears to be part of the worker thread to the REE global scheduler and execution of the TEE resulting from the call of the worker thread is accounted for in the thread statistics of the worker thread.

11. The method of claim 10, wherein in response to the REE global scheduler determining, using the thread statistics, that the worker thread is utilizing a low or a high proportion of the resources of the core it is executing on, the REE global scheduler decreases or increases the voltage and/or frequency of the core the worker thread is executing on respectively.

12. The method of claim 10, wherein the multicore processor is a heterogeneous multicore processor where at least one of the cores of the heterogeneous multicore processor has different performance characteristics to another one of the cores of the heterogeneous multicore processor, and
wherein in response to the REE global scheduler determining, using the thread statistics, that the worker thread is utilizing a low or high proportion of the resources of the core it is executing on, the REE global scheduler migrates the worker thread to a lower or higher performance core respectively.

13. The method of claim 1, further comprising providing a first TEE thread, a second TEE thread and a third TEE thread in the TEE, wherein responsive to each of the first TEE thread and the second TEE thread sending a request to the third TEE thread such that both the first TEE thread and the second TEE thread are blocked awaiting a response from the third TEE thread, the TEE scheduler removes the first TEE thread and the second TEE thread from the number of runnable TEE threads and ensures that the third TEE thread is included in the number of runnable TEE threads.

14. The method of claim 13, wherein in response to the first TEE thread or the second TEE thread receiving a response from the third TEE thread and hence becoming unblocked, the TEE scheduler re-includes the first TEE thread or the second TEE thread which has become unblocked.

15. The method of claim 1, wherein the number of worker threads are limited to a predetermined number and/or the cores on which the worker threads are permitted are restricted to a predetermined subset of the plurality of cores of the multicore processor.

16. The method of claim 1, wherein when a request is made from an REE application thread to the TEE, the REE application thread itself initially calls the TEE on the same core that the REE application is executing on, and upon return of the call a check is made to determine whether at least one worker thread is activated and responsive to a negative determination activating at least one worker thread.

17. The method of claim 16, wherein the cores on which the worker threads are permitted are restricted to a predetermined subset of the plurality of cores of the multicore processor, and wherein prior to the call by the REE application thread to the TEE, the REE application thread is migrated to one of the predetermined subset of the plurality of cores.

18. The method of claim 1, wherein when a TEE thread calls a sleep function, the TEE thread which calls the sleep function is removed from the number of runnable TEE threads and the corresponding wakeup time is communicated to the REE to wake up the TEE at the wakeup time.

19. A non-transitory, computer-readable storage medium storing a computer program for controlling an electronic device to perform the method of claim 1.

20. A device comprising:
a multicore processor operable to execute a rich execution environment (REE) and a trusted execution environment (TEE);
data storage storing at least one computer program for controlling the multicore processor to perform the method of claim 1.

* * * * *